United States Patent

Nakashima et al.

[11] Patent Number: 5,652,611
[45] Date of Patent: Jul. 29, 1997

[54] OPTICAL SCANNING SYSTEM AND IMAGE FORMING APPARATUS EMPLOYING SAME FOR ELECTROPHOTO GRAPHICALLY FORMING IMAGES

[75] Inventors: Hironori Nakashima, Kobe; Souji Ohba, Shijonawate; Manabu Kitajima, Osaka, all of Japan

[73] Assignee: Matsushita Electric Industrial Co., Ltd., Osaka-fu, Japan

[21] Appl. No.: 207,690

[22] Filed: Mar. 9, 1994

[30] Foreign Application Priority Data

| Mar. 11, 1993 | [JP] | Japan | 5-050344 |
| Mar. 11, 1993 | [JP] | Japan | 5-050345 |
| Mar. 11, 1993 | [JP] | Japan | 5-050347 |

[51] Int. Cl.$^6$ .................................. B41J 2/34
[52] U.S. Cl. ............... 347/206; 347/207; 347/259; 347/134
[58] Field of Search .................. 347/256, 258, 347/259, 241, 243, 244, 134, 205, 206, 207

[56] References Cited

U.S. PATENT DOCUMENTS

| 5,179,465 | 1/1993 | Kondo | 359/218 |
| 5,343,325 | 8/1994 | Yamakawa | 359/205 |

FOREIGN PATENT DOCUMENTS

| 56-141662 | 11/1981 | Japan |
| 58-93021 | 6/1983 | Japan |
| 58-179814 | 10/1983 | Japan |
| 58-179813 | 10/1983 | Japan |
| 59-214012 | 12/1984 | Japan |
| 61-156020 | 7/1986 | Japan |
| 62-30214 | 2/1987 | Japan |

*Primary Examiner*—Mark J. Reinhart
*Attorney, Agent, or Firm*—Wenderoth, Lind & Ponack

[57] ABSTRACT

An optical scanning system includes a first lens for receiving a light beam from a light source and allowing the light beam to pass therethrough, and a polygon mirror having at least one reflection surface for deflecting the light beam from the first lens by reflecting the light beam on the reflection surface thereof. A second lens is provided for receiving the light beam from the polygon mirror and focusing the light beam on a first plane to be scanned. The second lens has a first surface facing toward the polygon mirror and a second surface facing toward the first plane. The first surface is of a toric shape defined by rotating, about an axis of symmetry lying in a second plane which contains an optical axis of the second lens and is parallel to a first direction in which scanning takes place, a curve lying in the second plane and having a center of curvature on the optical axis, while the second surface is of a toric aspherical shape defined by a surface-generating profile equation in which terms have respective orders equal to or greater than a fourth order with respect to the first direction. The first and second surfaces of the second lens have radii of curvature R1 and R4, respectively, in the first direction as measured from the polygon mirror along the optical axis. The radii of curvature R1 and R4 have a relationship given by |R4|<|R1|.

30 Claims, 10 Drawing Sheets

OPTICAL SCANNING SYSTEM AND IMAGE FORMING APPARATUS EMPLOYING SAME FOR ELECTROPHOTO GRAPHICALLY FORMING IMAGES

BACKGROUND OF THE INVENTION

1. Field of the Invention

The present invention relates to an optical scanning system and also to an image forming apparatus, employing the same, such as, for example, a copier, a facsimile device, a laser beam printer or the like for electrophotographically forming images.

2. Description of Related Art

In this kind of optical scanning system, a light source is modulated by an image signal to emit an image-wise laser beam representing an original image. The laser beam emitted from the light source is directed toward a rotating or swivelling deflection means and is reflected or deflected thereby to scan the photosensitive member in a primary scanning direction. By so doing, the photosensitive member is exposed to the imagewise laser beam, while moving in a secondary scanning direction perpendicular to the primary scanning direction. As a result of the primary and secondary scannings, an electrostatic latent image corresponding to the image signal is formed on the photosensitive member.

The formation of the electrostatic latent image must be conducted with high accuracy, and accomplishment of the image exposure of a sufficient resolution needs a large number of refractive forces in an image-forming optical unit and requires a light-flux to be shaped by the external configuration of a lens in the image-forming optical unit, to thereby control the configuration of a beam converging toward a plane to be scanned. These methods, however, have some inherent performance limitations. In view of this, the conventional optical scanning systems generally make use of different refractive forces in the primary and secondary scanning directions to compensate for shortage of the refractive forces, or employ a light-flux shaper corresponding to the external size of the lens in the image-forming optical unit to compensate for shortage of the force required to control the convergent beam configuration.

To overcome such problems, an optical scanning system employing an odd-shaped or axially asymmetric lens in the image-forming optical unit or employing a light-flux shaper in the image-forming optical unit, particularly in a parallel light-flux portion thereof, is in practical use today.

FIG. 14 schematically depicts a conventional optical scanning system having a surface-tilt correction function. This optical scanning system comprises a laser diode 101 for emitting an elliptically shaped light beam 102, a first image-forming optical unit 103, a polygon mirror 104 as a deflection means, and a second image-forming optical unit 105. The first and second image-forming optical units 103 and 105 are disposed upstream and downstream of the polygon mirror 104 with respect to the direction of travel of the laser beam towards a photosensitive member 106, respectively. Each of the first and second image-forming optical units 103 and 105 has different refractive forces in the primary and secondary scanning directions. The elliptically shaped light beam 102 from the laser diode 101 is focused in a predetermined size on the photosensitive member 106 by utilizing a two-step image forming function by the first and second image-forming optical units 103 and 105. The first image-forming optical unit 103 has a light-flux shaper 108 disposed in a parallel light-flux portion 107 of the first image-forming optical unit 103 to control the beam configuration so as to be focused on the photosensitive member 106.

The optical scanning system of FIG. 14 also comprises a plurality of surface-tilt correction lenses disposed on a light path defined by the first and second image-forming optical units 103 and 105. These lenses act to compensate for surface tilts of a plurality of reflecting surfaces of the polygon mirror 104, which may be caused by an undesirable oscillatory or wobbling motion of a rotary shaft of the polygon mirror 104 and/or inaccurate assemblage of the polygon mirror 104.

Japanese Laid-open Patent Publication (unexamined) No. 62-30214 discloses an optical scanning system wherein for the purpose of minimizing the required surface area in which various optical elements comprising the optical scanning system are accommodated, optics on the incident side of the polygon mirror and those on the reflection side of the polygon mirror are disposed one above the other without interfering with each other while an incident light path of the former forms an angle with respect to a reflected light path of the latter. Furthermore, the optical scanning system is so designed as to cause a light beam to be incident on the polygon mirror from the direction along the centerline of a field of scan in order to simplify non-uniformity of the scanning speed on a plane to be scanned, i.e., to make the scanning speed on such plane symmetric with respect to the centerline of the field of scan. Also, to reduce the overall size of the optical scanning system, the optics on the incident side of the polygon mirror includes a lens or lenses which refract the beam from a light source prior to the incidence thereof on the polygon mirror at the aforementioned angle.

Recently, there has been an increasing demand toward a highly accurate image formation with high density printing. To achieve this, the use of a second image-forming optical unit having different sectional configurations in the primary and secondary scanning directions is preferred.

Japanese Laid-open Patent Publication (unexamined) No. 58-93021 discloses a cylindrical lens employed in an optical scanning system. Although the formation of the cylindrical configuration is relatively easy, it is difficult to correct curvature of field in both the primary and secondary scanning directions and, hence, the use of the cylindrical lens imposes a limitation on the highly accurate image formation.

Japanese Laid-open Patent Publication (unexamined) Nos. 58-179813 and 58-179814 disclose an optical scanning system employing a troidal lens. The troidal surface is difficult to make because it requires forcible bending of the cylindrical surface, thus imposing a limitation on the highly accurate image formation.

Furthermore, because each of the lenses as disclosed in the Japanese publications referred to above has no f-θ characteristics, the system requires an electric circuit for performing correction.

FIGS. 15 and 16 show graphs indicating the curvature of field and an f-θ characteristic in one of the prior art references, respectively. In FIG. 15, a solid line indicates the curvature of field in the primary scanning direction, while a dotted line indicates the curvature of field in the secondary scanning direction.

An alternative to achieve the highly accurate image formation with high density printing is to arrange a light-flux shaper such as, for example, a masking member having a slit in one of image-forming optical units at a location not affected by refraction. By so doing, it is possible to control the convergent beam configuration on the plane to be scanned.

FIGS. 17A and 17B show a graph indicating the beam configuration in the primary scanning direction and the beam configuration in the secondary scanning direction in the said one of the prior art references, respectively.

Japanese Laid-open Patent Publication (unexamined) No. 56-141662 discloses an optical scanning system wherein a masking member having a slit is disposed in a parallel light-flux portion. Although the installation and positioning of the masking member are relatively easy, the parallel light-flux portion must be provided in one of image-forming optical units, making it difficult to ensure the simplicity and reliability of the system. Accordingly, there is also a limitation in obtaining a highly accurate convergent beam.

Japanese Laid-open Patent Publication (unexamined) No. 59-214012 discloses a laser printer wherein a masking member having a slit is disposed immediately before the plane to be scanned. This printer is at a disadvantage in that because the masking member must be placed remotest from a light source and, hence, the installation and positioning thereof are difficult. In addition, there is a limitation in reducing the size of the system.

Furthermore, in order for the system as disclosed in the Japanese Laid-open Patent Publication No. 62-30214 referred to above to satisfy the aforementioned incidence conditions by refracting the light beam, it is necessary to pass the light beam through a peripheral portion of the lens of a large diameter, resulting in an increase in the size of the optics on the incident side. Although it is possible to use such a lens by removing an unnecessary portion thereof processing thereof takes a lot of time, resulting in an increase in manufacturing cost.

The accuracy with which the light path is changed by the lenses in the optics on the incident side depends much upon the processing accuracy of the lenses themselves, and a decreased processing accuracy is likely to change the position of incidence on the polygon mirror, to thereby lower image-forming characteristics. Also, temperature changes cause a change in refractive index of the lens, thus changing the light path.

SUMMARY OF THE INVENTION

The present invention has been developed to overcome the above-described disadvantages.

It is accordingly an objective of the present invention to provide an improved compact optical scanning system having a high resolution.

Another objective of the present invention is to provide the optical scanning system of the above-described type which has a simple structure and can be manufactured at a low cost.

A further objective of the present invention is to provide an image forming apparatus employing therein the optical scanning system referred to above.

In accomplishing the above and other objectives, the optical scanning system according to the present invention comprises a light source for emitting a light beam, a first image-forming optical unit for receiving the light beam from the light source and allowing the light beam to pass therethrough, a deflection means having at least one reflection surface for deflecting the light beam from the first image-forming optical unit by reflecting the light beam on the reflection surface thereof, and a second image-forming optical unit for receiving the light beam from the deflection means and focusing the light beam on a first plane to be scanned.

The second image-forming optical unit comprises a lens means having a first surface facing toward the deflection means and a second surface facing toward the first plane. The first surface is of a toric shape defined by rotating, about an axis of symmetry being parallel to a first direction in which scanning takes place and lying in a second plane containing an optical axis of the second image-forming optical unit, a curve lying in the second plane and having a center of curvature in alignment with a point on the optical axis. The second surface is of a toric aspherical shape defined by a surface-generating profile equation in which terms have respective orders equal to or greater than a fourth order with respect to the first direction. The first and second surfaces of the lens means have a radius of curvature R1 and a radius of curvature R4, respectively, in the first direction as measured from the deflection means along the optical axis, said radii of curvature R1 and R4 having a relationship given by:

$|R4|<|R1|$.

This construction can sufficiently correct not only curvature of field in the first direction, i.e., the primary scanning direction, but coma aberration in the first direction.

Preferably, the first and second surfaces of the lens means have a radius of curvature R3 and a radius of curvature R5, respectively, in a second direction perpendicular to the first direction as measured from the deflection means along the optical axis, said radii of curvature R3 and R5 having a relationship given by:

$|R3|<|R5|$.

By so doing, both the curvature of field in the first direction and that in the second direction can be simultaneously corrected and, also, spherical aberration in the second direction can be corrected.

If $|R3|<|R4|$, both the curvature of field in the first direction and curvature of scan can be sufficiently corrected.

If $|R1|<|R5|$, the curvature of field in the first direction and that in the second direction can be both simultaneously corrected, and the curvature of scan can be sufficiently corrected.

If $|R5|$ is infinity, not only the curvature of field in the first direction, but that in the second direction can be simultaneously corrected, and the curvature of scan can be sufficiently corrected. Furthermore, the surface shape of the lens means can be simplified.

Preferably, each of the first and second image-forming optical units comprises a single lens, making it possible to reduce the number of parts and simplify the system.

Advantageously, the reflection surface of the deflection means is of either a spherical shape or a cylindrical shape. Such a surface shape can widen the angle of scan and provides the deflection means with the lens effect, resulting in a reduction in the number of parts and simplification of the system. Also, the curvature of field in the first direction can be satisfactorily corrected.

If image formation on the first plane is carried out by post-objective scanning, the second image-forming optical unit is simplified in construction, and the number of parts is reduced.

Conveniently, the system further comprises a surface-tilt correction means for correcting surface tilts of the deflection means, which may be caused by an undesirable oscillatory or wobbling motion of a rotary shaft of the deflection means and/or inaccurate assemblage of the deflection means. The provision of the surface-tilt correction means enables properly positioned image formation with high accuracy.

In another aspect of the present invention, the lens means of the second image-forming optical unit is so positioned as to satisfy a relationship given by:

$0.60 < M/L < 0.85,$ where L indicates the distance between the reflection surface of the deflection means and the first plane along the optical axis, and M indicates the distance between the reflection surface of the deflection means and the first surface of the lens means along the optical axis.

Such arrangement contributes to sufficiently correcting the curvature of field in the first direction and, also, to correcting unevenness of scan and curvature of scan.

Advantageously, a masking member having a slit defined therein is disposed in the proximity of a focal point of the second image-forming optical unit on the side of the deflection means.

In a further aspect of the present invention, an optical scanning system comprises a light source for emitting a generally flat light beam, a first image-forming optical unit comprising a single lens for shaping and converging the light beam from the light source, and a deflection means having at least one reflection surface for deflecting the light beam from the first image-forming optical unit by reflecting the light beam on the reflection surface thereof. The optical scanning system also comprises a second image-forming optical unit disposed on a plane in which deflection of the light beam by the deflection means takes place. The second image-forming optical unit focuses the light beam from the deflection means on a photosensitive member.

In this optical scanning system, the direction in which the light beam from the first image-forming optical unit is incident on the deflection means forms a predetermined angle with respect to the said plane, and an optical axis of the first image-forming optical unit is in alignment with that of the second image-forming optical unit as viewed from such plane.

This optical scanning system is geometrically symmetric with respect to the light beam incident on the deflection means.

Furthermore, an image forming apparatus employing therein the optical scanning system referred to above is compact, has a high resolution, and can be readily manufactured at a low cost.

The present invention is based on the finding that in the case of the post-objective scanning, appropriate correction of the curvature of field, easy and inexpensive formation of the highly precise surface shapes of the second image-forming optical unit, and high-accuracy image formation on the plane to be scanned can be accomplished by:

(1) different sectional configurations of the second image-forming optical unit in the primary and secondary scanning directions and, in particular, surface shapes thereof on the optical axis having specific relationships in radius of curvature in the primary and secondary scanning directions, or (2) appropriate selection of the position of the correction lens 5 along the optical axis.

The present invention is also based on the finding that easy and highly accurate control of the convergent beam configuration and high-accuracy image formation can be accomplished by arranging the slit in the proximity of the focal point of the second image-forming optical unit on the side of the deflection means, with the plane to be scanned hardly affected by refraction.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1:
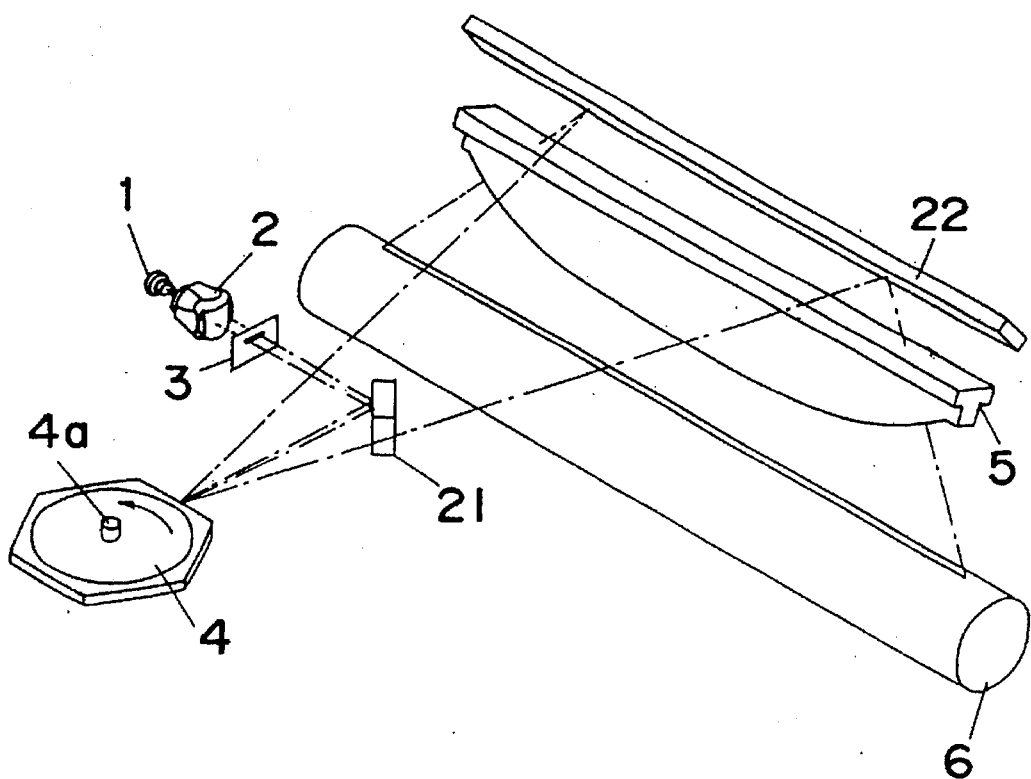
FIG. 1 is a schematic perspective view of an optical scanning system according to a first embodiment of to the present invention.
Figure 2:
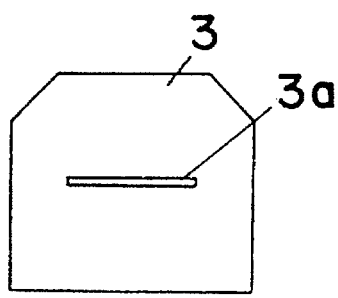
FIG. 2 is an elevational view of a masking member employed in the system of FIG. 1.

Referring now to the drawings, there is shown in FIG. 1 an optical post-objective scanning system embodying the present invention. This optical scanning system comprises a laser diode 1 for emitting a light beam therefrom, a converging lens 2 for converging the beam emitted from the laser diode 1, and a masking member 3 for controlling the beam configuration which is to be converged onto an image plane, i.e., a plane to be scanned. To obtain an appropriate beam configuration, the masking member 3 has a horizontally extending slit 3a of a proper size defined therein, which is particularly illustrated in FIG. 2. The masking member 3, however, may be of a design having an adjustable slit. The beam from the laser diode 1, having passed through the slit 3a in the masking member 3, is directed toward and reflected by a first reflection mirror 21 and is further directed toward a rotating mirror 4 employed as a deflection means, which is in the illustrated embodiment a polygon mirror having an axis of rotation 4a. The rotating mirror 4 has a plurality of side reflection surfaces each lying in a cylindrical plane.

It is, however, to be noted that each of the reflection surfaces is not limited to the cylindrical one but may be of a spherical shape. The reason for this is that the beam from the laser diode 1 is focused by the converging lens 2 onto any one of the reflection surfaces of the rotating mirror 4 in one direction, i.e., the secondary scanning direction perpendicular to the primary scanning direction, and this causes little change in refractive force in the secondary scanning direction, regardless of the configuration of the reflection surfaces, thus causing no substantial differences in the principle of operation.

The light beam reflected by the rotating mirror 4 is directed toward and further reflected by a second reflection mirror 22 and is incident on a correction lens 5. Thereafter, the beam, having passed through the correction lens 5, reaches a photosensitive drum 6 and is focused thereon.

In the illustrated embodiment, the converging lens 2 and the correction lens 5 are employed as first and second image-forming optical units, respectively.

Figure 3:
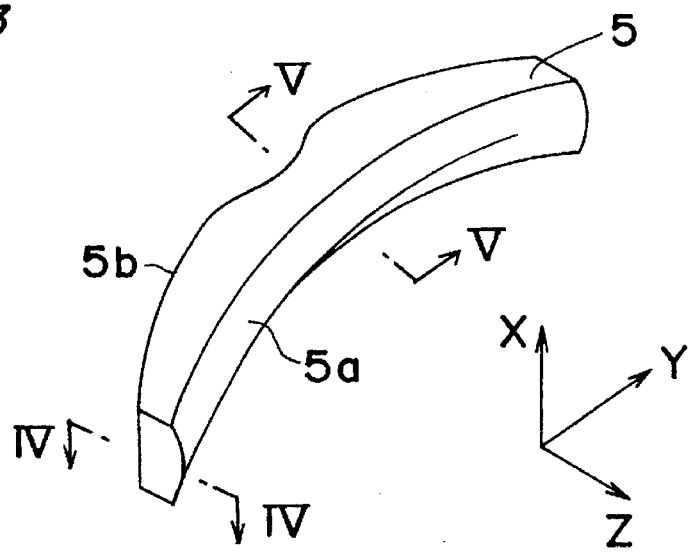
FIG. 3 is a perspective view of a correction lens employed in the system of FIG. 1.
Figure 4:
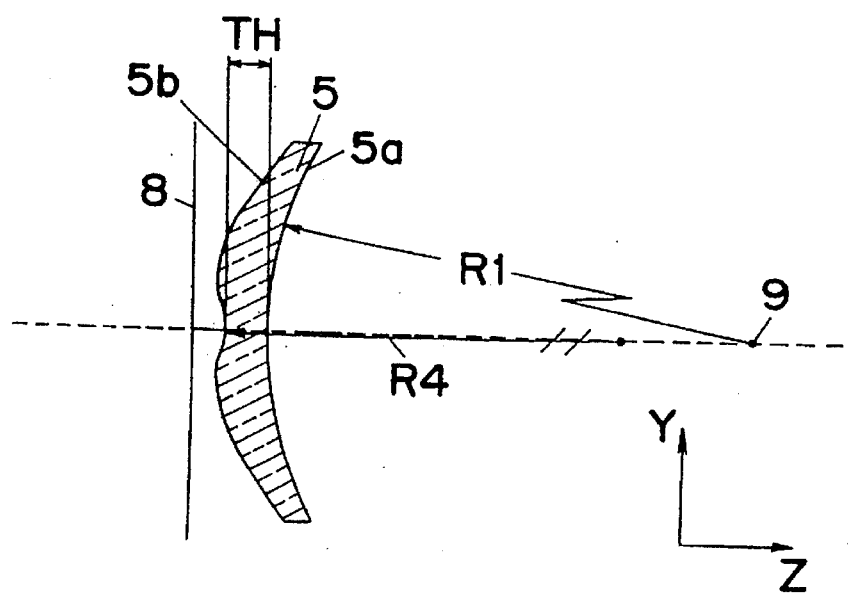
FIG. 4 is a directional view taken along line IV—IV in FIG. 3.
Figure 5:
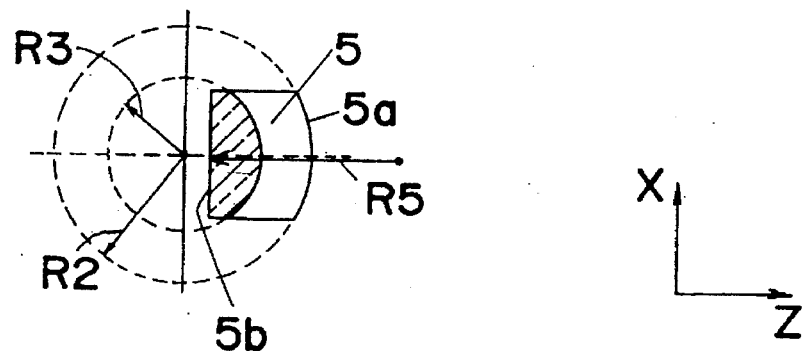
FIG. 5 is a sectional view taken along line V—V in FIG. 3.

As shown in FIGS. 3 to 5, the correction lens 5 has a first surface 5a facing toward the rotating mirror 4 via the second reflection mirror 22 and a second surface 5b facing toward the photosensitive drum 6. The first surface 5a is of a toric shape defined by rotating, about an axis of symmetry 8 perpendicular to an optical axis, an arc of R1 in radius having a center of curvature lying in alignment with a specific point 9 on the optical axis. In the practice of the present invention, the correction lens 5 having the toric surface 5a is positioned with the axis of symmetry 8 being parallel to the primary scanning direction and lying in a plane containing the optical axis. The second surface 5b is of a non-cylindrical shape having a sag portion from an apex thereof on the optical axis expressed, in the X-Y-Z coordinate system, by:

$$Z = \frac{\frac{Y^2}{R4}}{1 + \sqrt{\left(1-(1+K)\left(\frac{Y}{R4}\right)^2\right)}} + AY^4 + BY^6 + CY^6 + DY^{10}$$

where K, A, B, C, and D represent aspheric deformation coefficients of the $4^{th}$, $6^{th}$, $8^{th}$, and $10^{th}$ order terms, respectively. In FIGS. 4 and 5, TH represents the thickness of the correction lens 5 as measured along the optical axis, R2 the distance between the toric surface 5a and the axis of symmetry 8 at opposite ends of the correction lens 5, R3 the distance between the toric surface 5a and the axis of symmetry 8 on the optical axis, R4 the curvature of the second surface 5b of the correction lens 5 on the optical axis as measured from the incident side in the primary scanning direction, and R5 the curvature of the second surface 5b on the optical axis as measured from the incident side in the secondary scanning direction.

By way of example, Tables 1, 2 and 3 indicate specific numerical values, wherein Y0 represents an effective scanning width substantially equal to the width of a paper used, L the distance between the cylindrical reflection surface of the rotating mirror 4 and the photosensitive drum 6, R the curvature of the cylindrical reflection surface, and r the distance between the axis of rotation 4a of the rotating mirror 4 and an apex of the cylindrical reflection surface. Also, M represents the distance between the cylindrical reflection surface and the surface of incidence of the correction lens 5, d the distance between the surface of exit of the correction lens 5 and the photosensitive drum 6, and l the distance between the surface of incidence of the correction lens 5 and the masking member 3 as measured along the light path.

TABLE 1

| Y0 | L | R | r | M | d |
|---|---|---|---|---|---|
| 260 | 230 | 130 | 25 | 157 | 33 |
| R1 | R3 | R4 | R5 | TH | l |
| 697.71 | 21.04 | 168.73 | ∞ | 40 | 41 |
| K | A | B | C | D | |
| 0.0 | 6.264 × $10^{-8}$ | −2.495 × $10^{-12}$ | 1.362 × $10^{-16}$ | −1.522 × $10^{-21}$ | |

TABLE 2

| Y0 | L | R | r | M | d |
|---|---|---|---|---|---|
| 260 | 230 | 140 | 25 | 157 | 42 |
| R1 | R3 | R4 | R5 | TH | l |
| 696.68 | 21.78 | 221.19 | ∞ | 31 | 42 |
| K | A | B | C | D | |
| 0.0 | 9.294 × $10^{-8}$ | −2.161 × $10^{-12}$ | 1.133 × $10^{-16}$ | −5.145 × $10^{-22}$ | |

TABLE 3

| Y0 | L | R | r | M | d |
|---|---|---|---|---|---|
| 260 | 230 | 160 | 25 | 157 | 58 |
| R1 | R3 | R4 | R5 | TH | l |
| 730.02 | 23.04 | 598.76 | ∞ | 15 | 44 |
| K | A | B | C | D | |
| 0.0 | 1.186 × $10^{-8}$ | −3.249 × $10^{-12}$ | 1.764 × $10^{-16}$ | −2.960 × $10^{-21}$ | |

According to the present invention, |R1| is so chosen as to be greater than |R4|, or |R5| is so chosen as to be greater than |R3|. Preferably, |R3|<|R4|<|R1| and, more preferably, |R3|<|R4|<|R1|<|R5|. Conveniently, |R5| is so chosen as to be infinity, as shown in Tables 1, 2, and 3 above.

Alternatively, L and M are so chosen as to satisfy a relationship given by 0.60<M/L<0.85.

As is clear from the above and as can be readily known from FIGS. 3 to 5, the correction lens 5 employed as the second image-forming optical unit has different sectional configurations in the primary and secondary scanning directions, and surface shapes thereof on the optical axis have specific relationships in radius of curvature in the primary and secondary scanning directions. Alternatively, the position of the correction lens 5 along the optical axis is properly selected.

By so doing, not only curvature of field can be appropriately corrected, but also the correction lens 5 having highly precise surface shapes can be readily manufactured at a low cost. Also, image formation on the photosensitive drum 6 can be conducted with high accuracy.

Figure 6A:
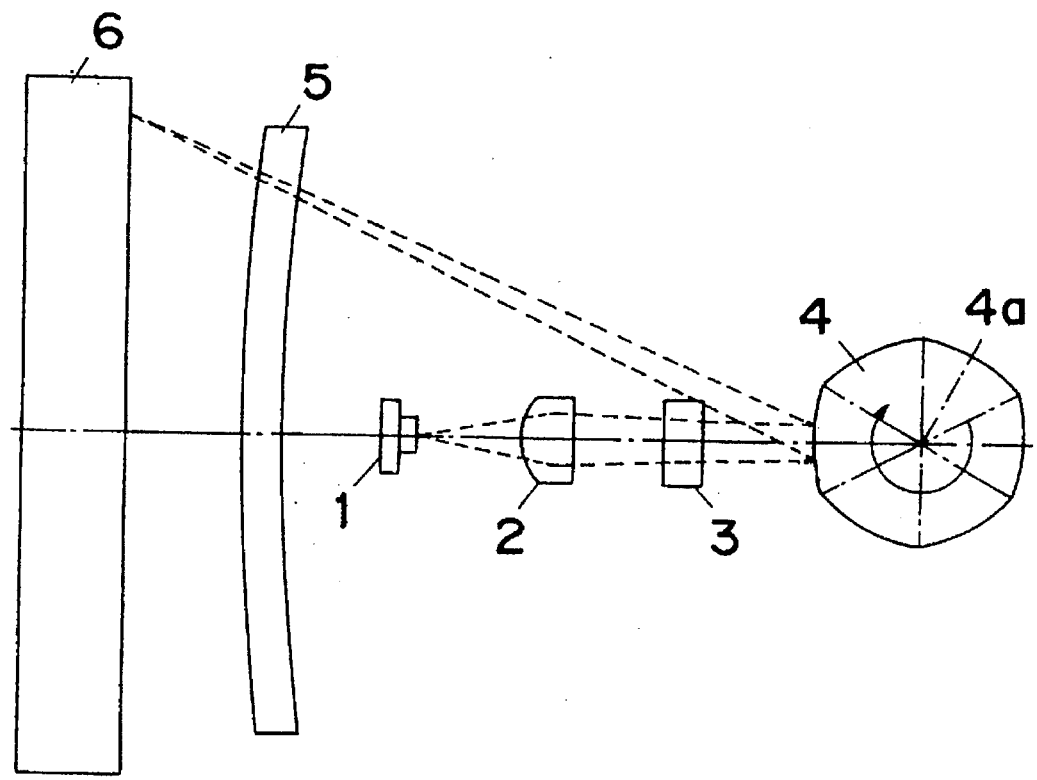
FIGS. 6A and 6B are a schematic top plan view and a schematic side view of the system of FIG. 1, respectively, particularly indicating how a light flux travels.
Figure 6B:
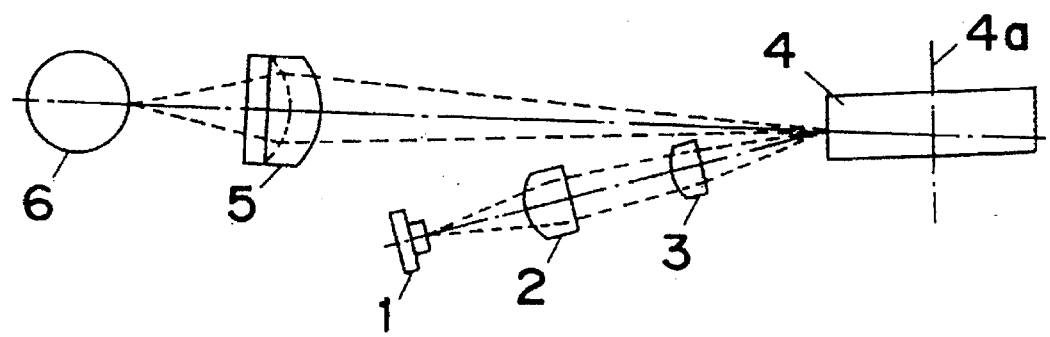

The operation of the optical post-objective scanning system referred to above is discussed hereinafter with reference to FIGS. 6A and 6B depicting the light path in a plane lying in the primary scanning direction and in a plane lying in the secondary scanning direction, respectively.

The light beam emitted from the laser diode 1 is converged by the converging lens 2 so as to be focused on two different points lying in the primary and secondary scanning directions, respectively. In the secondary scanning direction, the beam from the laser diode 1 converges in the neighborhood of the reflection surface of the rotating mirror 4. The rotating mirror 4 rotates about the axis of rotation 4a and deflects the beam incident thereon, which is in turn focused onto the photosensitive drum 6 by the correction lens 5 for scanning. At this moment, the beam focused on the plane to be scanned is controlled to a predetermined size in the secondary scanning direction and disorder of the configuration thereof is simultaneously corrected by regulating the area of the slit 3a in the masking member 3. To this end, the masking member 3 is disposed in the proximity of a focal point of the correction lens 5 in the secondary scanning direction. Because the correction lens 5 is disposed so that a deflection or reflection point thereon and that portion of the photosensitive drum 6 which is to be scanned are geometrically conjugate to each other in the secondary scanning direction, the correction lens 5 acts to correct surface tilts of the rotating mirror 4 and also correct curvature of field in the secondary scanning direction by reducing the refractive force in the secondary scanning direction as the location on which the reflected beam from the rotating mirror 4 is incident is brought near any of the opposite ends of the correction lens 5 in the primary scanning direction. Furthermore, an imaging position on the plane to be scanned in the primary scanning direction is caused to have an appropriate f-θ characteristic by rendering the surface of exit of the correction lens 5 to be of a non-cylindrical shape having a fourth order and higher order terms.

It is however to be noted that the surface of exit of the correction lens 5 may be of a toric aspherical shape.

Figure 7:
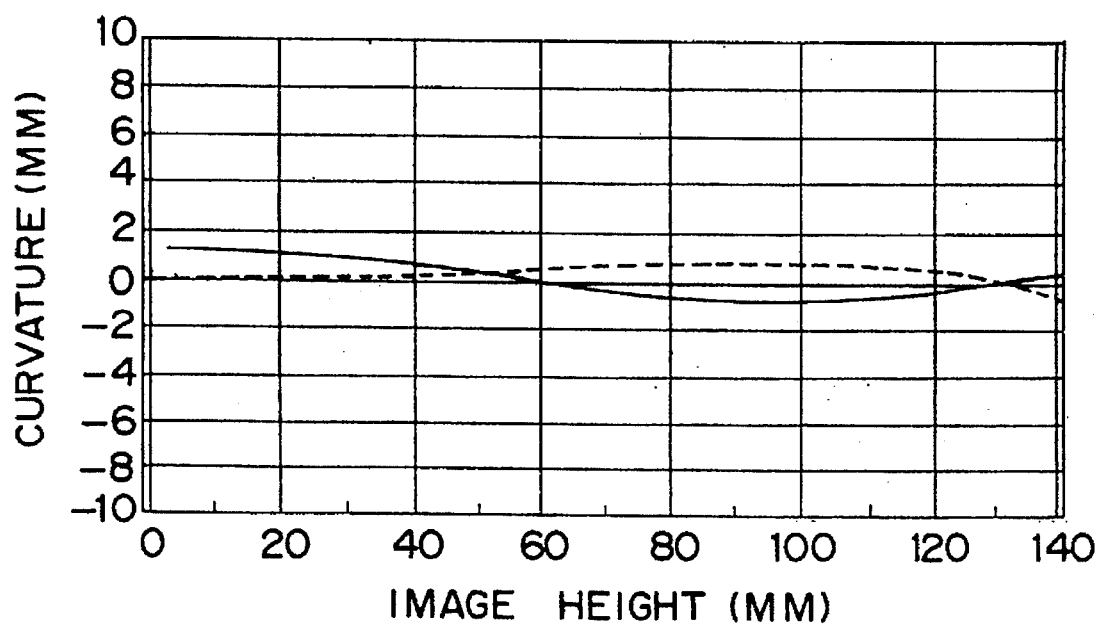
FIG. 7 is a graph indicating the extent to which curvature of field takes place.
Figure 8:
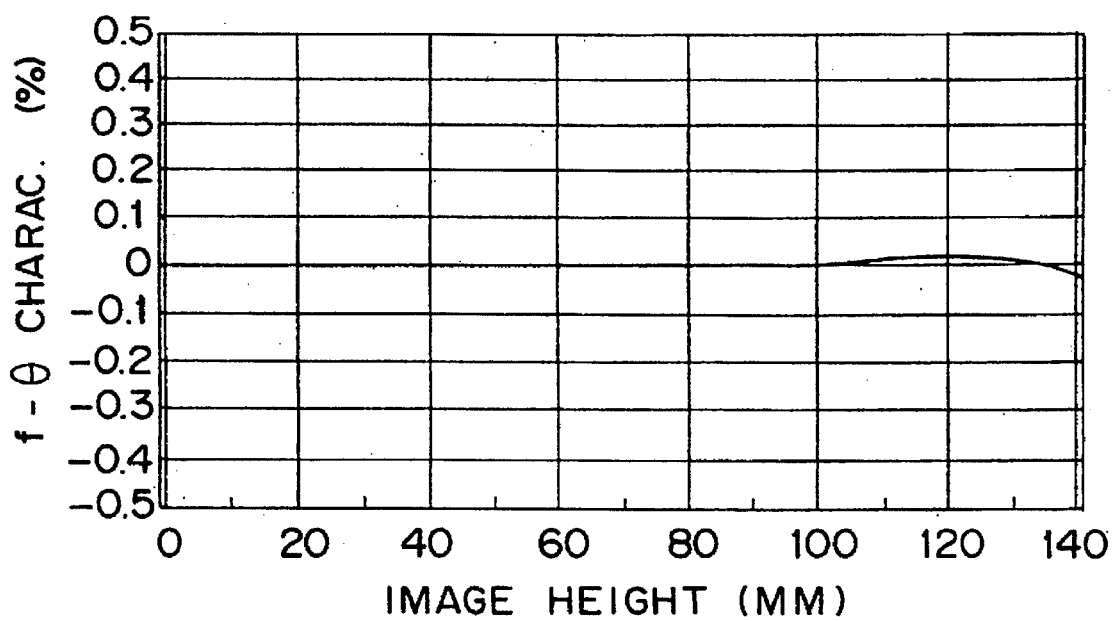
FIG. 8 is a graph indicating an f-θ characteristic in the system of FIG. 1.
Figure 9A:
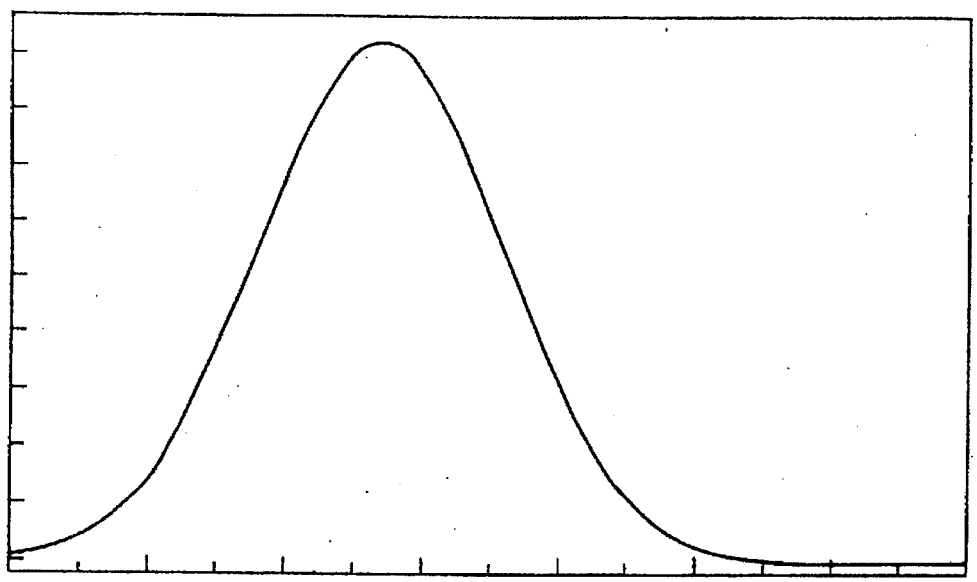
FIGS. 9A and 9B are graphs indicating the beam configuration in the primary scanning direction and that in the secondary scanning direction, respectively.
Figure 9B:
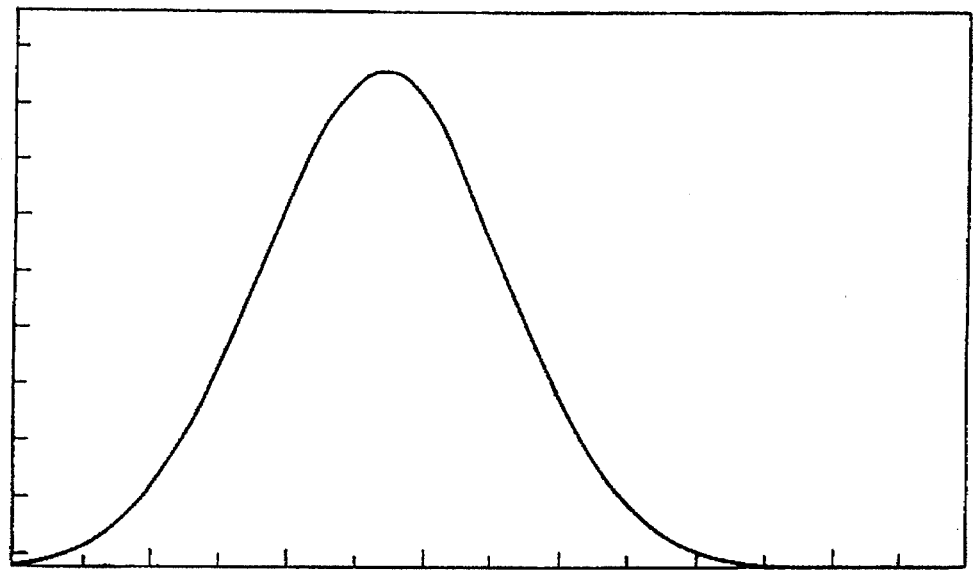

FIGS. 7 and 8 show a graph indicating the curvature of field and a graph indicating the f-θ characteristic of the optical scanning system referred to above, respectively. In the graph of FIG. 7, a solid line indicates the curvature of field in the primary scanning direction, while a dotted line indicates that in the secondary scanning direction. FIGS. 9A and 9B depict the beam configuration in the primary scanning direction and that in the secondary scanning direction, respectively.

As described hereinabove, according to the present invention, the use of the rotating mirror 4 in the form of a polygon as the deflection means is effective in correcting the curvature of field in the primary scanning direction. Also, the use of the correction lens 5 is effective in correcting the curvature of field in the primary scanning direction and in simultaneously correcting the curvature of field in the secondary scanning direction with an appropriate f-θ characteristic given to the imaging position. In addition; the beam focused on the plane to be scanned is controlled to a predetermined size in the secondary scanning direction and disorder of the configuration thereof is simultaneously corrected by regulating the area of the slit 3a in the masking member 3, as described above.

Figure 10:
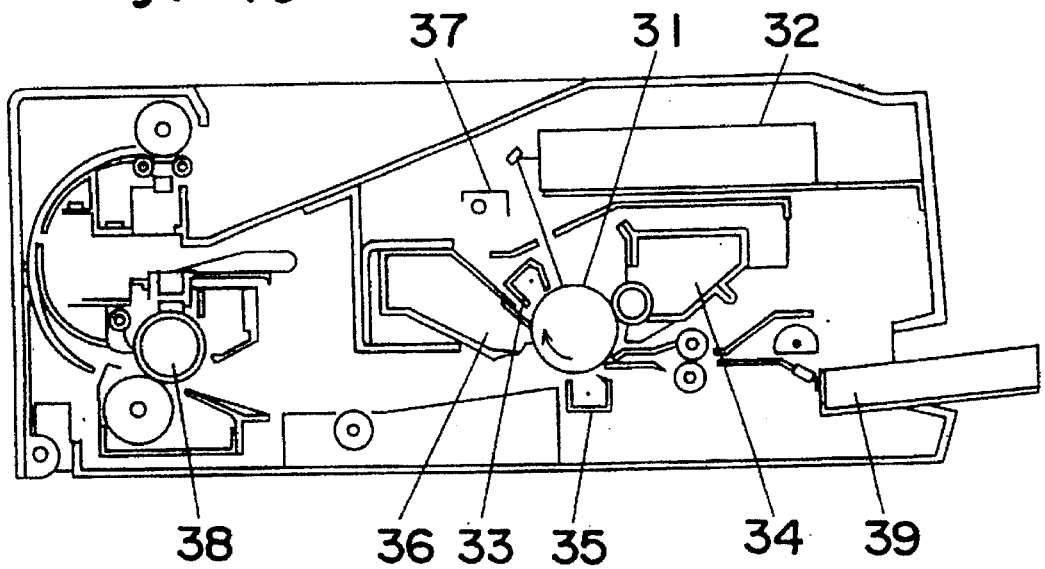
FIG. 10 is a side view of an image forming apparatus employing the system of FIG. 1.

FIG. 10 depicts an image forming apparatus employing the optical scanning system discussed above.

The image forming apparatus of FIG. 10 comprises a photosensitive drum 31 and an optical scanning system 32 of the present invention disposed above the photosensitive drum 31. A first charger 33, a developing unit 34, a transfer charger 35, and a cleaner 36 are disposed around the photosensitive drum 31 in this order in a direction of rotation of the photosensitive drum 31. A pre-exposure lamp 37 is disposed obliquely above the photosensitive drum 31, while a fixing unit 38 and a paper cassette 39 are disposed on opposite sides of the photosensitive drum 31.

It is to be noted that the present invention is applicable not only to the optical post-objective scanning system but to an optical pre-objective scanning system. Even in the latter, the effects of the present invention can be obtained in both the primary and secondary directions.

It is also to be noted that although the converging lens 2 is a single lens constituting the first image-forming optical unit while the correction lens 5 is a single lens constituting the second image-forming optical unit, at least one of the first and second image-forming optical units can be made up of a plurality of lenses.

Figure 11:
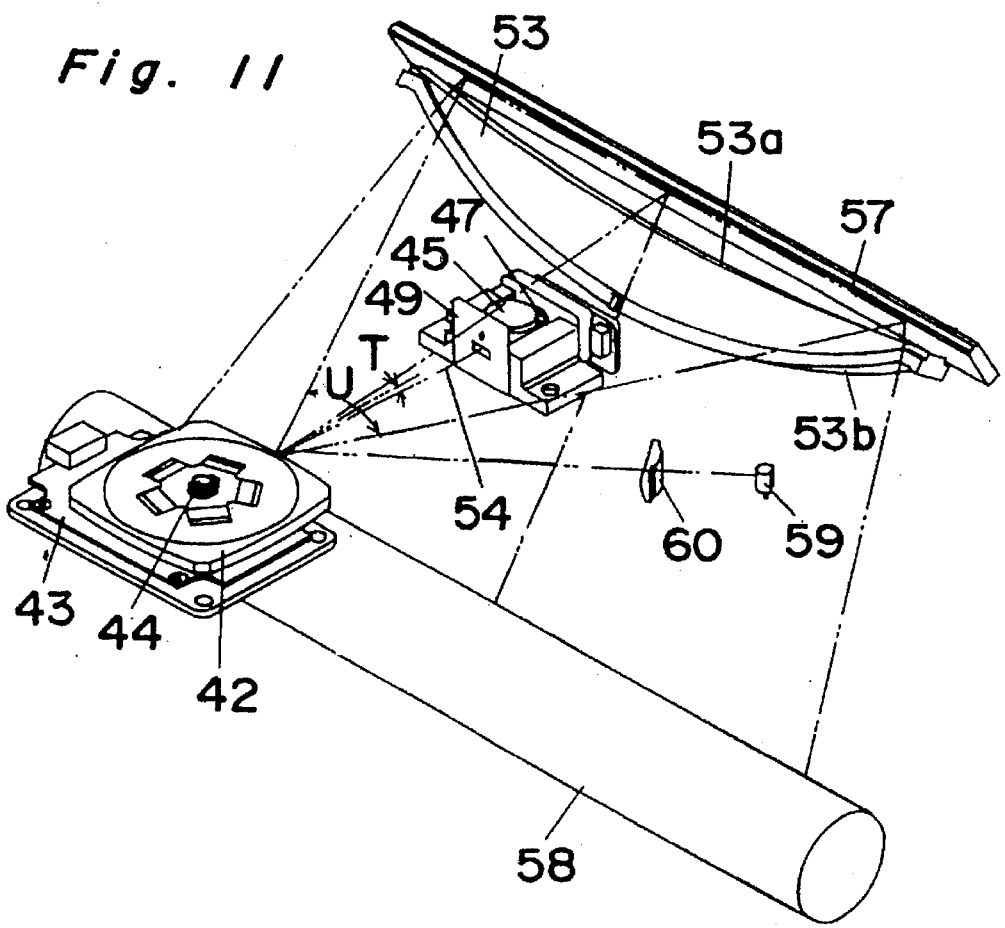
FIG. 11 is a schematic perspective view of an optical scanning system according to a second embodiment of the present invention.
Figure 12:
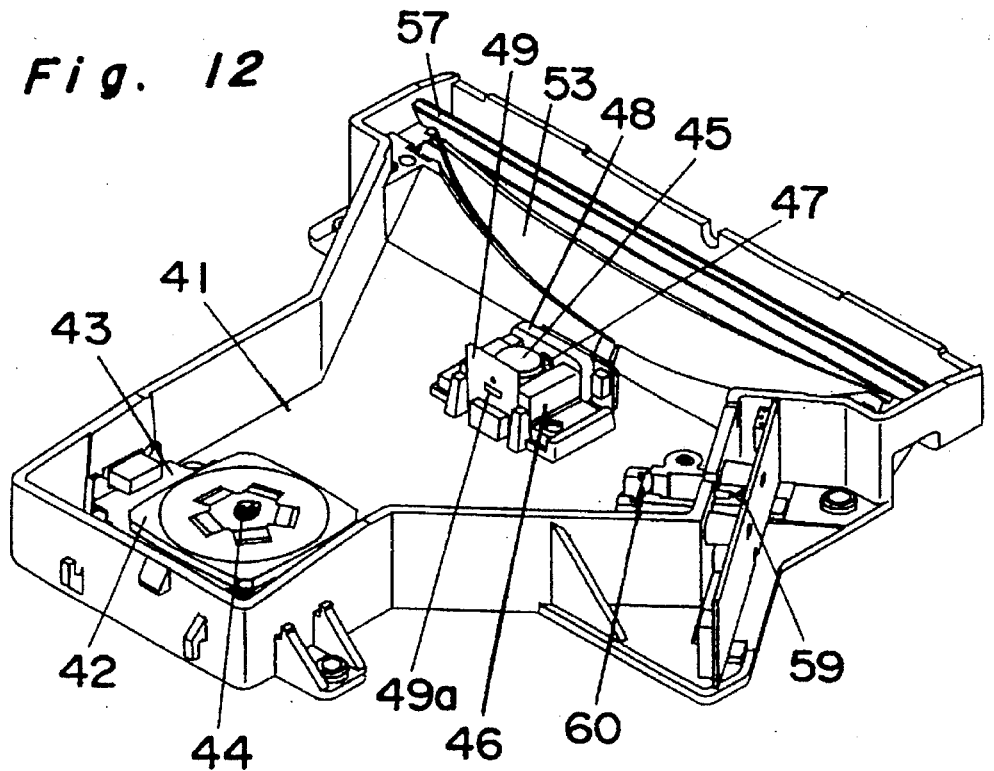
FIG. 12 is a schematic perspective view of the system of FIG. 11 when accommodated in a frame.

FIG. 11 depicts an optical scanning system according to a second embodiment of the present invention. This optical scanning system is in most cases incorporated in a frame 41 as shown in FIG. 12. The frame 41 is made of, for example, a highly accurate molded article.

As shown in FIGS. 11 and 12, a rotating mirror 42 in the form of a polygon and a single lens 45 constituting the first image-forming optical unit are mounted on the frame 41 in a spaced relationship. The rotating mirror 42, employed as a deflection means, is disposed on one side of the frame 41 and is accurately mounted on a spindle 44 of a high-speed drive motor 43. The rotating mirror 42 has a plurality of reflection surfaces each of a cylindrical shape in a direction of rotation thereof, thereby providing the reflection effect and the lens effect.

Held by a lens holder 46, the single lens 45 is fixed on the frame 41 at a central portion thereof. A laser holder 48 having a laser diode 47 as a light source pressed thereinto is mounted on one end of the lens holder 46, while a masking member 49 having a horizontally extending slit 49a defined therein is mounted on the other end of the lens holder 46 to control the configuration of light having passed through the single lens 45. The laser diode 47 is of a design capable of emitting an elliptically cross-sectioned bundle of divergent rays of light which are in turn converged and shaped by the lens 45.

Figure 13A:
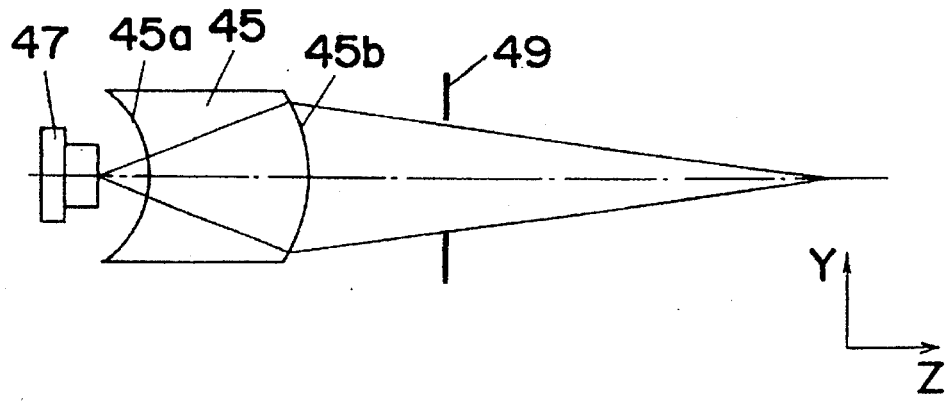
FIGS. 13A and 13B are a top plan view and a side view of a first image-forming optical unit employed in the system of FIG. 11, respectively.
Figure 13B:
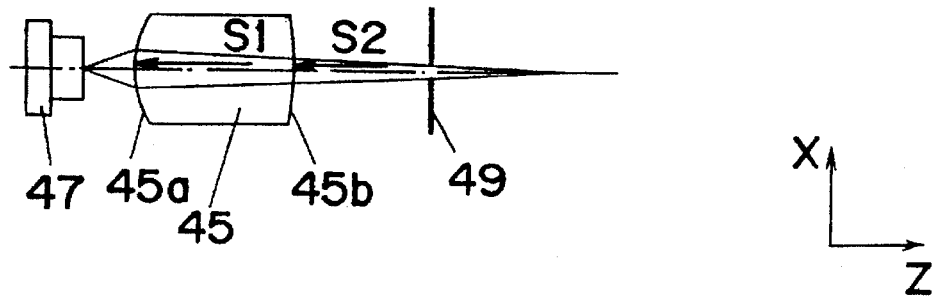
Figure 14:
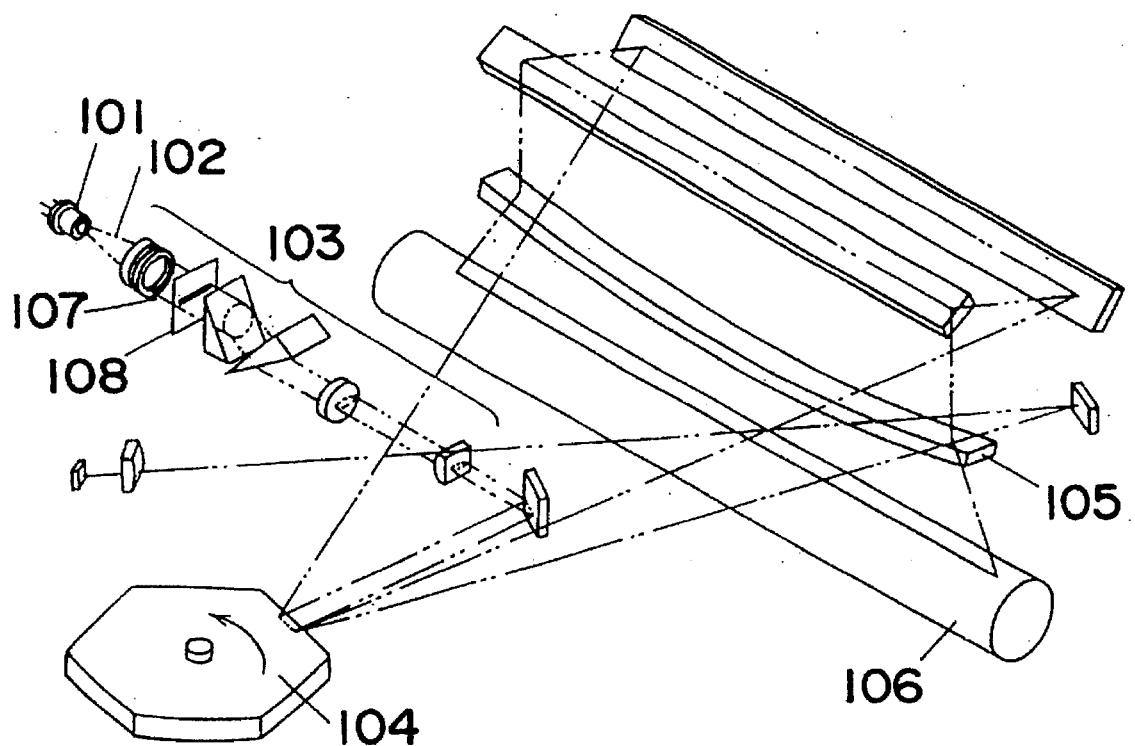
FIG. 14 is a schematic perspective view of a conventional optical post-objective scanning system.
Figure 15:
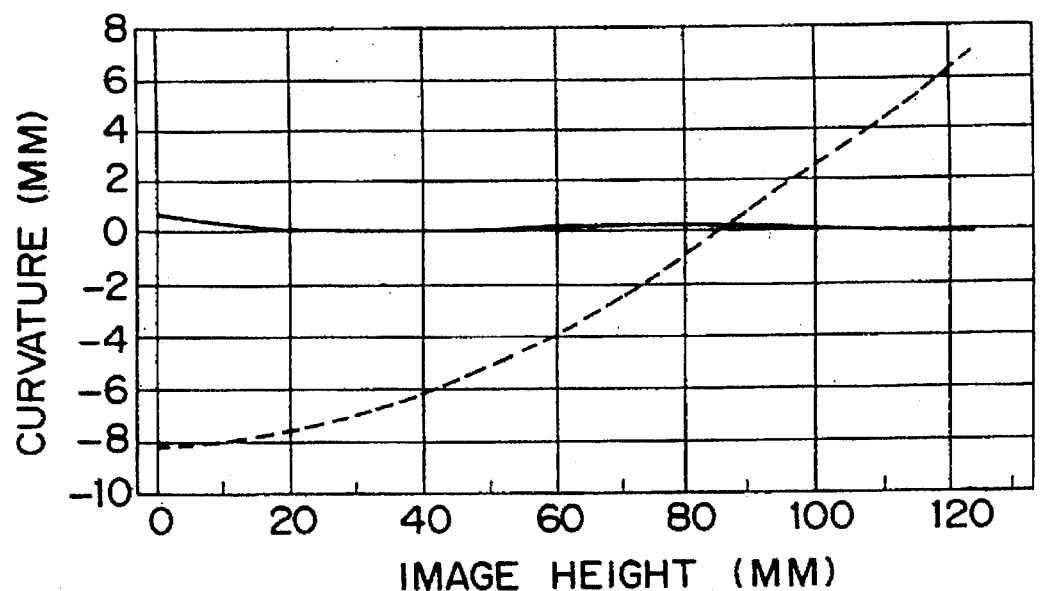
FIG. 15 is a graph indicating the extent to which curvature of field takes place in the system of FIG. 14.
Figure 16:
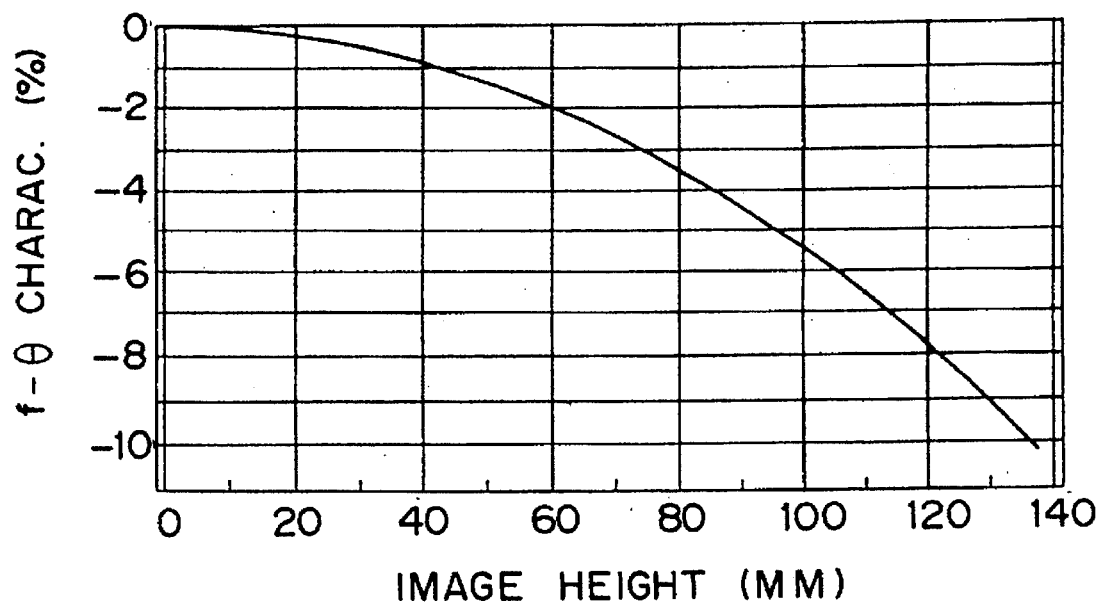
FIG. 16 is a graph indicating an f-θ characteristic in the system of FIG. 14.
Figure 17A:
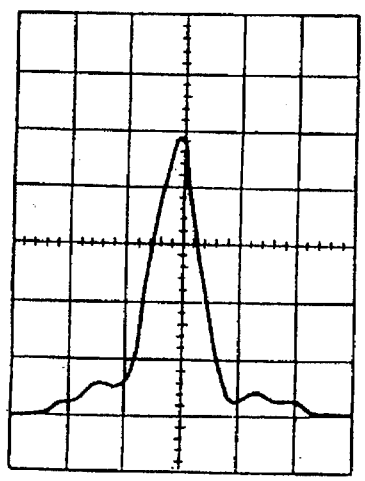
FIGS. 17A and 17B are a graph indicating the beam configuration in the primary scanning direction and a graph indicating the beam configuration in the secondary scanning direction in the system of FIG. 14, respectively.
Figure 17B:
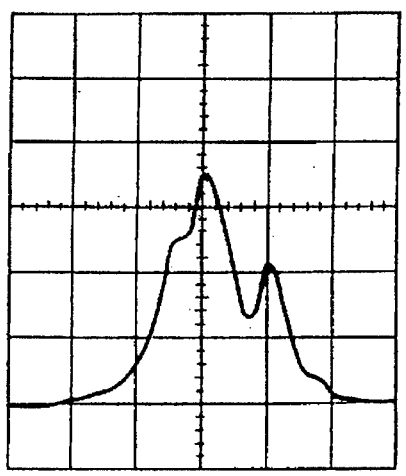

FIGS. 13A and 13B depict the configuration of the lens 45. As shown in these figures, the lens 45 has a first surface 45a and a second surface 45b opposite to each other, each of which is of an anamorphic configuration having different radii of curvature in the primary scanning direction parallel to the direction of rotation of the rotating mirror 42 and in the secondary scanning direction perpendicular to the primary scanning direction. An optical axis of the lens 45 is in alignment with that of the laser diode 47 so that the major and minor axes of the elliptically shaped beam from the laser diode 47 may extend in the primary and secondary directions, respectively. Furthermore, the slit 49a in the masking member 49 extends in the primary scanning direction, while the lens holder 46 is properly positioned so that outgoing light from the lens 45 is directed to the center of the motor spindle 44 via the slit 49a and is incident on the rotating mirror 42 at an angle T. Because the lens 45 is complicated in configuration, it is generally directly molded from glass material.

An elongated single lens 53 constituting the second image-forming optical unit and having a linearity correction function is disposed opposite to the rotating mirror 42 in a spaced relationship from the lens 45. The lens 53 extends in a direction perpendicular to an optical axis 54 of the first image-forming optical unit and is placed symmetrically with respect to this optical axis 54 so as to lie in a plane which the rotating mirror 42 scans.

The lens 53 has a first surface 53a and a second surface 53b opposite to each other. The first surface 53a is of a toric shape having a negative radius of curvature in the primary scanning direction and also having a positive radius of curvature in the secondary scanning direction which varies from the lens center. The second surface 53b is of a cylindrical shape having a positive radius of curvature in the primary scanning direction. This lens 53 has a long complicated configuration and is primarily made of a highly accurate resinous molded article resistant to heat and insusceptible to water.

The light beam reflected at the angle T and deflected by the rotating mirror 42 scans a V-shaped field extending at an angle U and is incident on the center of the toric lens 53 in the secondary scanning direction.

A reflection mirror 57 is disposed obliquely above the toric lens 53 to change or bend the light path. A beam detection sensor 59 and a beam detection lens 60 are disposed aside the lens 45 at a location outside the scan field U to obtain synchronization required to start writing or printing images. A cylindrical lens is preferably used for the beam detection lens 60.

A photosensitive drum 58 having an axis of rotation in the primary scanning direction is disposed below the frame 41. The photosensitive drum 58 is exposed to imagewise light for subsequent formation of an electrostatic latent image thereon.

The optical scanning system of the above-described construction operates as follows.

Based on an image signal from the system, the laser diode 47 receives a video signal along with a predetermined clock signal, and a synchronization detection signal from the beam detection sensor 59 turns the laser diode 47 on. A beam emitted from the laser diode 47 passes through and is slightly converged by the lens 45 in the primary scanning direction, and is then focused by the rotating mirror 42 to a predetermined beam spot on the photosensitive drum 58. In the secondary direction, the beam from the laser diode 47 is temporarily focused on the rotating mirror 42 and is then diverged thereby. This divergent beam from the rotating mirror 42 is finally focused by the long toric lens 53 on the photosensitive drum 58. Because of this, the lens 45 has a large ratio of the focal length in the primary scanning direction to that in the secondary scanning direction, while the slit 49a in the masking member 49 has a large aspect ratio, i.e., a large ratio of the long side to the short side. Accordingly, it is necessary to make the beam configuration from the lens 45 flatter than the elliptically shaped beam from the laser diode 47.

Although the light beam incident on the rotating mirror 42 at the angle T is reflected thereby at the same angle, rotation of the rotating mirror 42 is followed by a back-and-forth movement of the mirror surface, which in turn causes a vertical movement of the reflection point of the light beam on the rotating mirror 42, resulting in bending of the light beam focused on the photosensitive drum 58. Accordingly, a small angle of incidence is preferred.

However, as the angle of incidence T becomes smaller, there arises an interference between the first and second image-forming scanning units, which causes the possibility of the light beam travelling in an undesired direction. Up to this time, the polygon mirror has been in most cases spaced away from the lenses of the first image-forming optical unit to the extent of causing no interference, resulting in an increase in size of the lens assembly.

According to the second embodiment of the present invention, the use of the single lens 45 for the first image-forming optical unit can reduce the angle of incidence T without increasing the distance between the rotating mirror 42 and the light source, and the required image-forming characteristics can be obtained.

In this embodiment, if the radius of curvature R of the polygon mirror 42, the radius r of an inscribed circle of the polygon mirror 42, the distance E between the polygon mirror 42 and the single lens 45, the distance M between the polygon mirror 42 and the toric lens 53 along the optical axis, the distance d between the photosensitive drum 58 and the toric lens 53, the angle of incidence T, the scan angle U, the radii of curvature S1 and S2 of the first and second surfaces 45a and 45b of the lens 45 in the secondary scanning direction are chosen to take the following values, curvature of scan on the photosensitive drum 58 can be reduced to 0.2 mm or smaller.

R=140 mm, r=25 mm, E=70 mm,
M=152 mm, d=83 mm, T=25°,
U=30°, S1=3 mm, and S2=130 mm Furthermore, because the system of the present invention is so designed that light having passed through the lens 45 travels along the optical axis thereof and is then directly incident on the polygon mirror 42, the point of incidence on the polygon mirror 42 does not significantly change. This improves the image-forming characteristics and enhances the resolution. Also, because the optical geometry of the present invention is made symmetric with respect to the aforementioned optical axis, all the lenses used can be manufactured with ease. In addition, the single lens 45 is molded from glass, contributing to a considerable reduction in the number of parts, reducing the manufacturing cost thereof, and enhancing the system reliability.

As described hereinabove, according to the present invention, |R1| is so chosen as to be greater than |R4|. This relationship enables not only sufficient correction of curvature of field in the primary scanning direction, but also correction of coma aberration in the primary scanning direction, making the convergent beam sufficiently uniform in the primary scanning direction and providing the system with a high resolution.

Furthermore, |R5| is so chosen as to be greater than |R3|. This relationship enables simultaneous correction of both the curvature of field in the first direction and that in the second direction and, also, enables correction of spherical aberration in the second direction. As a result, the convergent beam is made uniform in both the primary and secondary directions, to thereby provide the system with a high resolution.

When |R3|<|R4|<|R1|, the scanning characteristics are further improved.

When |R5| is infinity as shown in Tables 1, 2, and 3 above, the curvature of field in the first direction and that in the second direction can be both simultaneously corrected, and the curvature of scan can be sufficiently corrected. Furthermore, because the surface shape of the lens of the second image-forming optical unit can be simplified, the manufacturing cost thereof can be reduced.

When the lens of the second image-forming optical unit satisfies 0.60<M/L<0.85, not only the curvature of field in the first direction is sufficiently corrected, but also unevenness of scan and curvature of scan are both corrected. Accordingly, the convergent beam in the primary scanning direction is made satisfactorily uniform, realizing a high resolution and high-accuracy scanning characteristics.

Furthermore, each of the first and second image-forming optical units comprises a single lens, and the reflection surface of the deflection means is of either a spherical shape or a cylindrical shape. These features of the present invention make it possible to reduce the number of parts and simplify the system, resulting in simplification of the system assemblage and adjustments, high reliability of the system, and a reduction in both size and cost of the system.

The provision of the surface-tilt correction means avoids an undesirable oscillatory motion of a rotary shaft of the deflection means and/or inaccurate assemblage of the deflection means, enabling properly positioned image formation with high accuracy. Accordingly, the resolution is enhanced and the scanning characteristics are improved. Also, the system assemblage and adjustments are simplified and the system reliability is ensured.

Furthermore, the image forming apparatus employing therein the optical scanning system of the present invention is compact, has a high resolution, and can be readily manufactured at a low cost.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An optical scanning system comprising:

a light source for emitting a light beam;

a first image-forming optical unit for receiving the light beam from said light source and allowing the light beam to pass therethrough;

a deflection means having at least one reflection surface for deflecting the light beam from said first image-forming optical unit by reflecting the light beam on the reflection surface thereof;

a second image-forming optical unit for receiving the light beam from said deflection means and focusing the light beam on a first plane to be scanned; and said second image-forming optical unit comprising a lens member having a first surface facing toward said deflection means and a second surface facing toward the first plane, said first surface being of a toric shape defined by rotating, about an axis of symmetry being parallel to a first direction in which scanning takes place and lying in a second plane containing an optical axis of said second image-forming optical unit, a curve lying in the second plane and having a center of curvature in alignment with a point on the optical axis, said second surface being of a toric aspherical shape defined by a surface-generating profile equation in which terms have respective orders equal to or greater than a fourth order with respect to the first direction, said first and second surfaces of said lens member having a radius of curvature R1 and a radius of curvature R4, respectively, in the first direction as measured from said deflection means along the optical axis, said radii of curvature R1 and R4 having a relationship given by:

|R4|<|R1|.

2. The optical scanning system according to claim 1, wherein said first and second surfaces of said lens member have a radius of curvature R3 and a radius of curvature R5, respectively, in a second direction perpendicular to said first direction as measured from said deflection means along the optical axis, said radii of curvature R3 and R5 having a relationship given by:

|R3|<|R5|.

3. The optical scanning system according to claim 2, wherein |R3|<|R4|.

4. The optical scanning system according to claim 3, wherein |R1|<|R5|.

5. The optical scanning system according to claim 4, wherein |R5| is infinity.

6. The optical scanning system according to claim 4, wherein said lens member comprises a single lens.

7. The optical scanning system according to claim 6, wherein the reflection surface of said deflection means is of a spherical shape.

8. The optical scanning system according to claim 6, wherein the reflection surface of said deflection means is of a cylindrical shape.

9. The optical scanning system according to claim 7, wherein image formation on the first plane is carried out by post-objective scanning.

10. The optical scanning system according to claim 9, wherein said first image-forming optical unit comprises a single lens.

11. The optical scanning system according to claim 10, further comprising a surface-tilt correction means for correcting surface tilts of said deflection means.

12. An optical scanning system comprising:

a light source for emitting a light beam;

a first image-forming optical unit for receiving the light beam from said light source and allowing the light beam to pass therethrough;

a deflection means having at least one reflection surface for deflecting the light beam from said first image-forming optical unit by reflecting the light beam on the reflection surface thereof;

a second image-forming optical unit for receiving the light beam from said deflection means and focusing the light beam on a first plane to be scanned; and said second image-forming optical unit comprising a lens member having a first surface facing toward said deflection means and a second surface facing toward the first plane, said first surface being of a toric shape defined by rotating, about an axis of symmetry lying in a second plane which contains an optical axis of said second image-forming optical unit and is parallel to a first direction in which scanning takes place, a curve lying in the second plane and having a center of curvature in alignment with a point on the optical axis, said second surface being of a toric aspherical shape defined by a surface-generating profile equation in which terms have respective orders equal to or greater than a fourth order with respect to the first direction, said first and second surfaces of said lens means have a radius of curvature R3 and a radius of curvature R5, respectively, in a second direction perpendicular to said first direction as measured from said deflection means along the optical axis, said radii of curvature R3 and R5 having a relationship given by:

|R3|<|R5|.

13. An optical scanning system comprising:

a light source for emitting a light beam;

a first image-forming optical unit for receiving the light beam from said light source and allowing the light beam to pass therethrough;

a deflection means having at least one reflection surface for deflecting the light beam from said first image-forming optical unit by reflecting the light beam on the reflection surface thereof;

a second image-forming optical unit for receiving the light beam from said deflection means and focusing the light beam on a first plane to be scanned; and said second image-forming optical unit comprising a lens member having a first surface facing toward said deflection means and a second surface facing toward the first plane, said first surface being of a toric shape defined by rotating, about an axis of symmetry lying in a second plane which contains an optical axis of said second image-forming optical unit and is parallel to a first direction in which scanning takes place, a curve lying in the second plane and having a center of curvature in alignment with a point on the optical axis, said second surface being of a toric aspherical shape defined by a surface-generating profile equation in which terms have respective orders equal to or greater than a fourth order with respect to the first direction, said lens means having a relationship given by:

$0.60 < M/L < 0.85$, where L indicates the distance between the reflection surface of said deflection means and the first plane along the optical axis, and M indicates the distance between the reflection surface of said deflection means and the first surface of said lens member along the optical axis.

14. The optical scanning system according to claim 13, wherein said lens member comprises a single lens.

15. The optical scanning system according to claim 14, wherein the reflection surface of said deflection means is of a spherical shape.

16. The optical scanning system according to claim 14, wherein the reflection surface of said deflection means is of a cylindrical shape.

17. The optical scanning system according to claim 15, wherein image formation on the first plane is carried out by post-objective scanning.

18. The optical scanning system according to claim 17, wherein, said first image-forming optical unit comprises a single lens.

19. The optical scanning system according to claim 18, further comprising a surface-tilt correction means for correcting surface tilts of said deflection means.

20. An optical scanning system comprising:
a light source for emitting a light beam;
a single lens for receiving the light beam from said light source and allowing the light beam to pass therethrough;
a deflection means having at least one reflection surface for deflecting the light beam from said first image-forming optical unit by reflecting the light beam on the reflection surface thereof;
an image-forming optical unit for receiving the light beam from said deflection means and focusing the light beam on a first plane to be scanned; and
a masking member having a slit defined therein and disposed on an optical path between said single lens and said image-forming optical unit and in the proximity of a focal point of said image-forming optical unit on a side of said deflection means; and
wherein image formation on the first plane is carried out by post-objective scanning.

21. The optical scanning system according to claim 20, wherein said second image-forming optical unit comprises a single lens.

22. The optical scanning system according to claim 21, wherein said second image-forming optical unit has a first surface of a toric shape facing toward said deflection means and a second surface of a toric aspherical shape facing toward said first plane and defined by a surface-generating profile equation in which terms have respective orders equal to or greater than a fourth order.

23. The optical scanning system according to claim 21, wherein said second image-forming optical unit has a first surface of a toric shape facing toward said deflection means and a second surface of a non-cylindrical shape facing toward said first plane and defined by a surface-generating profile equation in which terms have respective orders equal to or greater than a fourth order.

24. The optical scanning system according to claim 22, wherein the reflection surface of said deflection means is of a spherical shape.

25. The optical scanning system according to claim 22, wherein the reflection surface of said deflection means is of a cylindrical shape.

26. The optical scanning system according to claim 24, further comprising a surface-tilt correction means for correcting surface tilts of said deflection means.

27. An optical scanning system comprising:
a light source for emitting a generally flat light beam;
a first image-forming optical unit comprising a single lens having an optical axis for shaping and converging the light beam from said light source;
a deflection means having at least one reflection surface for deflecting the light beam from said first image-forming optical unit by reflecting the light beam on the reflection surface thereof; and
a second image-forming optical unit having an optical axis and disposed on a plane in which deflection of the light beam by said deflection means takes place, said second image-forming optical unit being adapted to focus the light beam from said deflection means on a photosensitive member,
wherein a direction in which the light beam from said first image-forming optical unit is incident on said deflection means forms a predetermined angle with respect to said plane, and wherein the optical axis of said first image-forming optical unit is in alignment with that of said second image-forming optical unit as viewed from said plane.

28. An image forming apparatus employing therein an optical scanning system which comprises:
a light source for emitting a light beam;
a first image-forming optical unit comprising a first single lens for receiving the light beam from said light source and allowing the light beam to pass therethrough;
a deflection means having at least one reflection surface of a spherical shape for deflecting the light beam from said first image-forming optical unit by reflecting the light beam on the reflection surface thereof;
a surface-tilt correction means for correcting surface tilts of said deflection means;
a second image-forming optical unit for receiving the light beam from said deflection means and focusing the light beam on a first plane to be scanned; and
said second image-forming optical unit comprising a second single lens having a first surface facing toward said deflection means and a second surface facing toward the first plane, said first surface being of a toric shape defined by rotating, about an axis of symmetry lying in a second plane which contains an optical axis of said second image-forming optical unit and is parallel to a first direction in which scanning takes place, a curve lying in the second plane and having a center of curvature in alignment with a point on the optical axis, said second surface being of a toric aspherical shape defined by a surface-generating profile equation in which terms have respective orders equal to or greater than a fourth order with respect to the first direction, said first surface of said second single lens having a radius of curvature R1 in the first direction and a radius of curvature R3 in a second direction perpendicular to the first direction, respectively, said second surface of said second single lens having radii of curvature R4 and R5 in the first and second directions, respectively, said radii of curvature R1, R3, R4, and R5 being measured from said deflection means along the optical axis and having a relationship given by:

$|R3| < |R4| < |R1| < |R5|$, whereby image formation on the first plane is carried out by post-objective scanning.

29. An image forming apparatus employing therein an optical scanning system which comprises:

a light source for emitting a light beam;

a first image-forming optical unit comprising a first single lens for receiving the light beam from said light source and allowing the light beam to pass therethrough;

a deflection means having at least one reflection surface of a spherical shape for deflecting the light beam from said first image-forming optical unit by reflecting the light beam on the reflection surface thereof;

a surface-tilt correction means for correcting surface tilts of said deflection means;

a second image-forming optical unit for receiving the light beam from said deflection means and focusing the light beam on a first plane to be scanned; and said second image-forming optical unit comprising a second single lens having a first surface facing toward said deflection means and a second surface facing toward the first plane, said first surface being of a toric shape defined by rotating, about an axis of symmetry lying in a second plane which contains an optical axis of said second image-forming optical unit and is parallel to a first direction in which scanning takes place, a curve lying in the second plane and having a center of curvature in alignment with a point on the optical axis, said second surface being of a toric aspherical shape defined by a surface-generating profile equation in which terms have respective orders equal to or greater than a fourth order with respect to the first direction, said second single lens having a relationship given by:

$$0.60 < M/L < 0.85,$$

where L indicates the distance between the reflection surface of said deflection means and the first plane along the optical axis, and M indicates the distance between the reflection surface of said deflection means and the first surface of said second single lens along the optical axis, whereby image formation on the first plane is carried out by post-objective scanning.

30. An image forming apparatus employing therein an optical scanning system which comprises:

a light source for emitting a light beam;

a first image-forming optical unit comprising a first single lens for receiving the light beam from said light source and allowing the light beam to pass therethrough;

a deflection means having at least one reflection surface of a spherical shape for deflecting the light beam from said first image-forming optical unit by reflecting the light beam on the reflection surface thereof;

a surface-tilt correction means for correcting surface tilts of said deflection means;

a second image-forming optical unit for receiving the light beam from said deflection means and focusing the light beam on a first plane to be scanned, said second image-forming optical unit comprising a second single lens which has a first surface of a toric shape facing toward said deflection means and a second surface of a toric aspherical shape facing toward said first plane and defined by a surface-generating profile equation in which terms have respective orders equal to or greater than a fourth order; and a masking member having a slit defined therein and disposed in the proximity of a focal point of said second image-forming optical unit on a side of said deflection means, whereby image formation on the first plane is carried out by post-objective scanning.

* * * * *